United States Patent
Shen et al.

(10) Patent No.: US 7,924,792 B2
(45) Date of Patent: Apr. 12, 2011

(54) METHOD, SYSTEM, GATEWAY AND USER DEVICE FOR RECEIVING/SENDING MULTIMEDIA MESSAGE

(75) Inventors: Jun Shen, Beijing (CN); Song Song, Beijing (CN); Pei Sun, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 11/083,889

(22) Filed: Mar. 18, 2005

(65) Prior Publication Data

US 2005/0207379 A1   Sep. 22, 2005

(30) Foreign Application Priority Data

Mar. 22, 2004   (CN) .......................... 2004 1 0031507

(51) Int. Cl.
*H04W 4/00* (2009.01)
*H04M 3/42* (2006.01)

(52) U.S. Cl. ..................... 370/338; 455/466; 455/414.1; 455/426.1

(58) Field of Classification Search .................. 370/338, 370/401; 455/466, 414.1, 426.1
See application file for complete search history.

(56) References Cited

U.S. PATENT DOCUMENTS

| | | | |
|---|---|---|---|
| 6,766,162 B1 * | 7/2004 | Beamish | 455/412.1 |
| 2001/0053687 A1 | 12/2001 | Sivula | |
| 2003/0040280 A1 | 2/2003 | Koskelainen | |
| 2003/0172121 A1 | 9/2003 | Evans | |
| 2003/0182396 A1 * | 9/2003 | Reich et al. | 709/218 |
| 2004/0111476 A1 * | 6/2004 | Trossen et al. | 709/206 |
| 2004/0121764 A1 * | 6/2004 | Rivero | 455/418 |
| 2004/0218575 A1 * | 11/2004 | Ibe et al. | 370/338 |
| 2005/0079873 A1 * | 4/2005 | Caspi et al. | 455/456.1 |
| 2005/0198193 A1 * | 9/2005 | Halme | 709/217 |
| 2006/0084417 A1 * | 4/2006 | Melpignano et al. | 455/418 |
| 2006/0182055 A1 * | 8/2006 | Coffee et al. | 370/328 |
| 2008/0049696 A1 * | 2/2008 | Stewart | 370/338 |

FOREIGN PATENT DOCUMENTS

| | | |
|---|---|---|
| JP | 2001-183866 A | 7/2001 |
| JP | 2006-335046 A | 12/2006 |
| WO | WO/01/33782 A | 5/2001 |
| WO | WO 03/094553 A | 11/2003 |

OTHER PUBLICATIONS

Mostafa, M-E, "MMS—the modern wireless solution for multimedia messaging" Personal, Indoor and mobile radio Communications, 2002; Sep. 15, 2002; vol. 5; pp. 2466-2472.

* cited by examiner

*Primary Examiner* — George Eng
*Assistant Examiner* — Muthuswamy G Manoharan
(74) *Attorney, Agent, or Firm* — Michael J. Buchenhorner; Vazken Alexanian

(57) ABSTRACT

Methods, systems, gateways and user devices for receiving/sending multimedia message. According to the invention, a multimedia messaging service system comprising a wireless LAN, a multimedia messaging service user device and a multimedia messaging service gateway, the user device communicates with the gateway via the wireless LAN so as to send and receive multimedia messages. Furthermore, the gateway of the invention detect whether the user device is located within the wireless LAN. If yes, then multimedia messages are sent and received via the wireless LAN; and if not, then via conventional telecom network. The invention also discloses a corresponding gateway and a corresponding user device.

13 Claims, 5 Drawing Sheets

US 7,924,792 B2

METHOD, SYSTEM, GATEWAY AND USER DEVICE FOR RECEIVING/SENDING MULTIMEDIA MESSAGE

TECHNICAL FIELD

The invention relates to multimedia messaging service (MMS), particularly a multimedia messaging service system, a gateway and a user device used in the system, and a method for receiving/sending multimedia message.

BACKGROUND

Multimedia messaging service (MMS) is a new global messaging standard that enables a wide range of different media elements, including text, color pictures, animations, audio samples, and video clips. MMS promises a dramatic increase in messaging capabilities that will enrich user experience and create a major new source of revenue for network operators as well as service providers and enterprises. However, If MMS is deployed in B2E (Business-to-Enterprise) and B2C (Business-to-Customer) applications to support mobile employee and consumers, there are two requirements for this usage. The first one is that some small businesses need a simple way to send multimedia messages (hereinafter referred to as "MMS messages") to the mobile users. Another requirement is that an end-to-end solution is needed for large enterprises to provide a high security message solution for enterprise applications. However, the current MMS infrastructure can't meet these two requirements. In addition, wireless LAN is becoming more and more popular in an enterprise, so when an employee is at office, sending and receiving MMS via wireless LAN (WLAN) is a better solution than via telecom network (such as Global System for Mobile Communications (GSM), General Packet Radio Service (GPRS), Code Division Multiple Access (CDMA), and so on) for enterprise because the performance of the solution is very good and its cost is very low.

FIG. 1 shows a general view of the MMS architecture, in which the most important component is a MMS Center (or MMS Gateway) 102 including two subsystems: an MMS server 104 and an MMS relay 106. The MMS server is responsible for storing and handling incoming and outgoing messages by means of a message storage 108. Associated with the MMS server is the MMS relay, which is responsible for transferring messages between different messaging systems. Because MMS is a message store/forward system, MMS messages have to be stored and forwarded by the MMS Center owned by a telecom operator when enterprise users communicate with the backend system (MMS applications 112) with a multimedia messaging user device (hereinafter referred to as "MMS user device") via the MMS channel.

Therefore there is a potential security problem in this kind of systems since it is not an end-to-end solution for enterprise mobile applications. Another problem is the interface between the MMS center and enterprise applications. Currently different MMS centers provide different APIs, which brings some troubles for service providers to connect those different operators. Furthermore, if an enterprise wants to connect to an operator's MMS center, it has to sign a contract with the operator to follow the operator's price and security policy. Maybe this also brings some inconvenience for enterprises.

SUMMARY OF THE INVENTION

Therefore, the present invention provides a new MMS system supporting MMS applications in a wireless LAN environment. The invention provides a multimedia messaging service system (MMS system) comprising: a wireless LAN; a MMS user device for sending and receiving multimedia message over the wireless LAN; a MMS gateway, for receiving, storing and sending the multimedia message sent by the MMS user device.

Another aspect of the invention is to provide a MMS system supporting both telecom network and wireless LAN and having improved security.

Another aspect of the invention is to provide a MMS user device, a MMS gateway that may be used in above system, and a method for receiving/sending MMS message.

Another aspect of the invention is a MMS gateway comprising: a presence manager for detecting whether a MMS user device is located a wireless LAN; a multimedia message storage/transceiver for storing the multimedia messages sent by MMS user devices; a notification sender for sending a notification over the wireless LAN to the MMS user device when a multimedia message is present in the multimedia message storage/transceiver and when the presence manager detects that the MMS user device is located in the wireless LAN.

Another aspect of the invention is a method for receiving/sending a multimedia message, wherein the multimedia message is sent and received between a MMS user device and a MMS gateway via a wireless LAN.

BRIEF DESCRIPTION OF THE DRAWINGS

Other aspects, features and advantages of the invention will become more apparent after reading the following detailed description of the preferred embodiments. The accompanying drawings, which are incorporated in and constitute a part of the specification, illustrate embodiments of the invention and, together with the description, serve to explain the principles of the invention. In the drawings.

DESCRIPTION OF THE INVENTION

Figure 1:
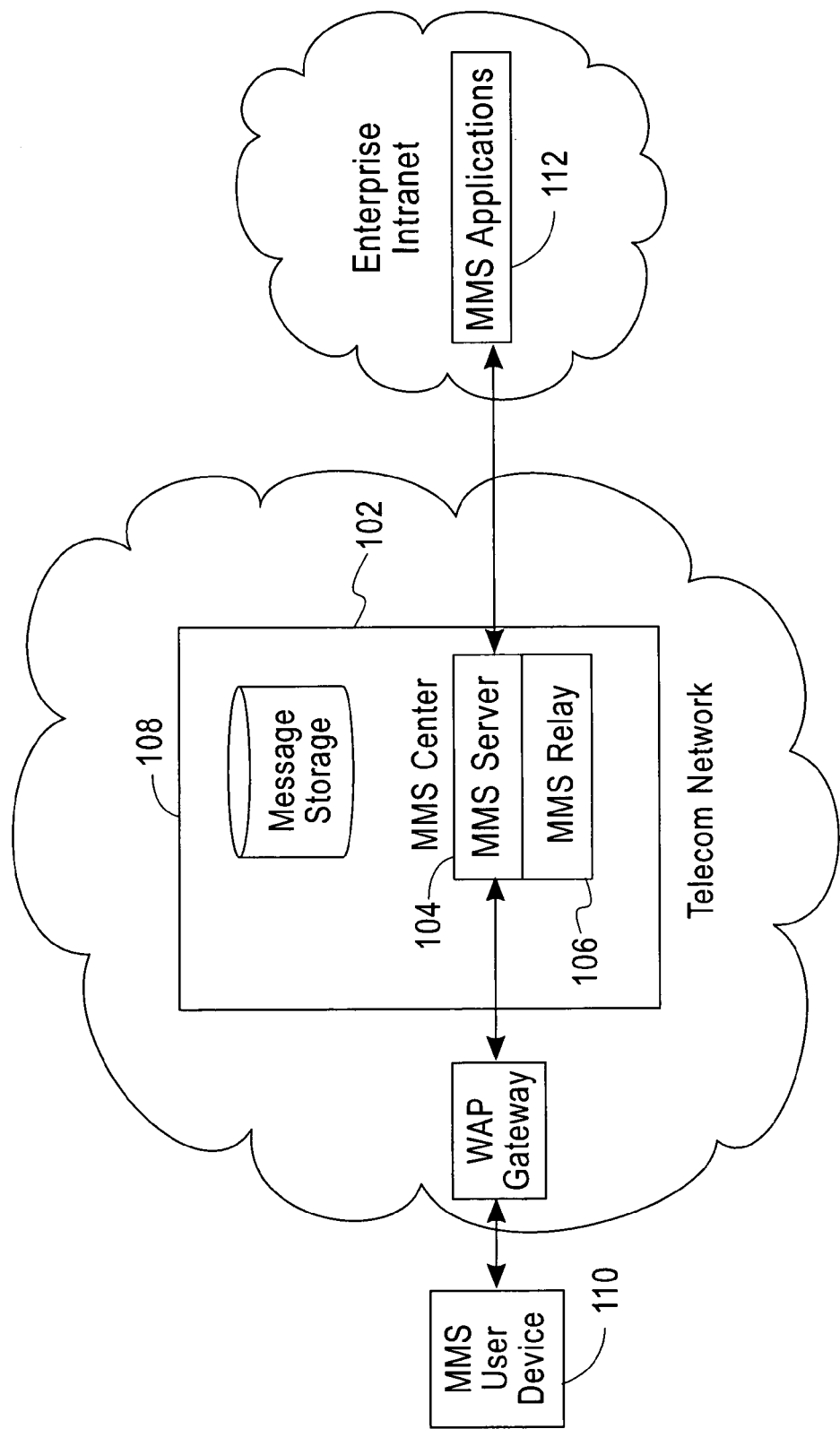
FIG. 1 is an overview of a MMS system in the prior art.

The present invention provides an MMS system supporting MMS applications in a wireless LAN environment. It provides a multimedia messaging service system (MMS system) comprising: a wireless LAN; a MMS user device for sending and receiving multimedia message over the wireless LAN; a MMS gateway, for receiving, storing and sending the multimedia message sent by the MMS user device. Accordingly, it is possible to provide a direct MMS communication channel between MMS users and backend systems for enterprise applications over telecom network.

The invention also provides a MMS system supporting both telecom network and wireless LAN and having improved security. Thus, the invention is to setup a direct communication channel between the MMS user device and the enterprise applications. Because there is a way to bypass the operator's MMS Center without storing MMS messages on the MMS Center, so we can encrypt the communication channel between the client and the backend MMS server with some security protocols, e.g. WTLS (Wireless Transport Layer Security), to enhance the security for MMS applications. When the user moves into a wireless LAN enabled office and the user's MMS device can access enterprise intranet via wireless LAN, the backend server can detect the user's roaming and switch its working model from the telecom model to WLAN model. Therefore the user could use an MMS device to access MMS applications via WLAN in an enterprise.

The invention also provides a MMS user device, a MMS gateway that may be used in above system, and a method for receiving/sending MMS message. Specifically, the invention provides a MMS user device comprising: a heartbeat sender for sending heartbeat signals to be detected by a wireless LAN; a notification receiver for receiving from the wireless LAN a notification indicating a fact that there is a multimedia message to be received; a Message transceiver for sending multimedia message by sending a request carrying the multimedia message over the wireless LAN, and in response to the notification, sending a request carrying storage location information of the multimedia message over the wireless LAN so that the wireless LAN receives the multimedia message.

The invention also provides a MMS gateway comprising: a presence manager for detecting whether a MMS user device is located a wireless LAN; a multimedia message storage/transceiver for storing the multimedia messages sent by MMS user devices; a notification sender for sending a notification over the wireless LAN to the MMS user device when a multimedia message is present in the multimedia message storage/transceiver and when the presence manager detects that the MMS user device is located in the wireless LAN.

The invention also provides a method for receiving/sending a multimedia message, wherein the multimedia message is sent and received between a MMS user device and a MMS gateway via a wireless LAN. Preferably, the method detects whether a wireless LAN is available, and if not, then a telecom network will be used in sending and receiving multimedia messages between the MMS user device and the MMS gateway.

The invention has changed the MMS operational model and brought at least one of the following advantages:

1. The invention can provide an end-to-end security solution for MMS applications, especially for enterprise applications;

2. Based on the invention, it is more convenient for enterprises to provide various kinds of MMS applications than before because there is no limitation from the operator;

3. The invention also changes the MMS price model. Currently the cost of sending MMS is much higher than SMS (Shore Messaging Service). This greatly limits the wide usage of MMS in the consumer and enterprise market. However, through the invention, the user can send and receive MMS messages without passing the MMS center, therefore the MMS price model is based on data flow, not on message number. Therefore it is possible for enterprise to benefit from the solution by reducing the operational cost;

4. The invention is also advantageous to telecom network operators. They still could provide MMS services over GPRS network as soon as possible even if there is no MMS billing system and MMS center, for example in undeveloped regions;

5. WLAN support makes it possible to provide MMS services in an enterprise with better performance and lower cost than GPRS or other telecom networks;

6. Multiple network support and transparent switching among those networks could cover much larger areas and make users use one of communication channels, which is the best choice for them at that time, to send and receive multimedia messages.

Preferred embodiments of the present invention will now be described with reference to the accompanying drawings. It should be noted that throughout the description and the drawings, identical or corresponding components will be denoted with identical reference signs.

Figure 2:
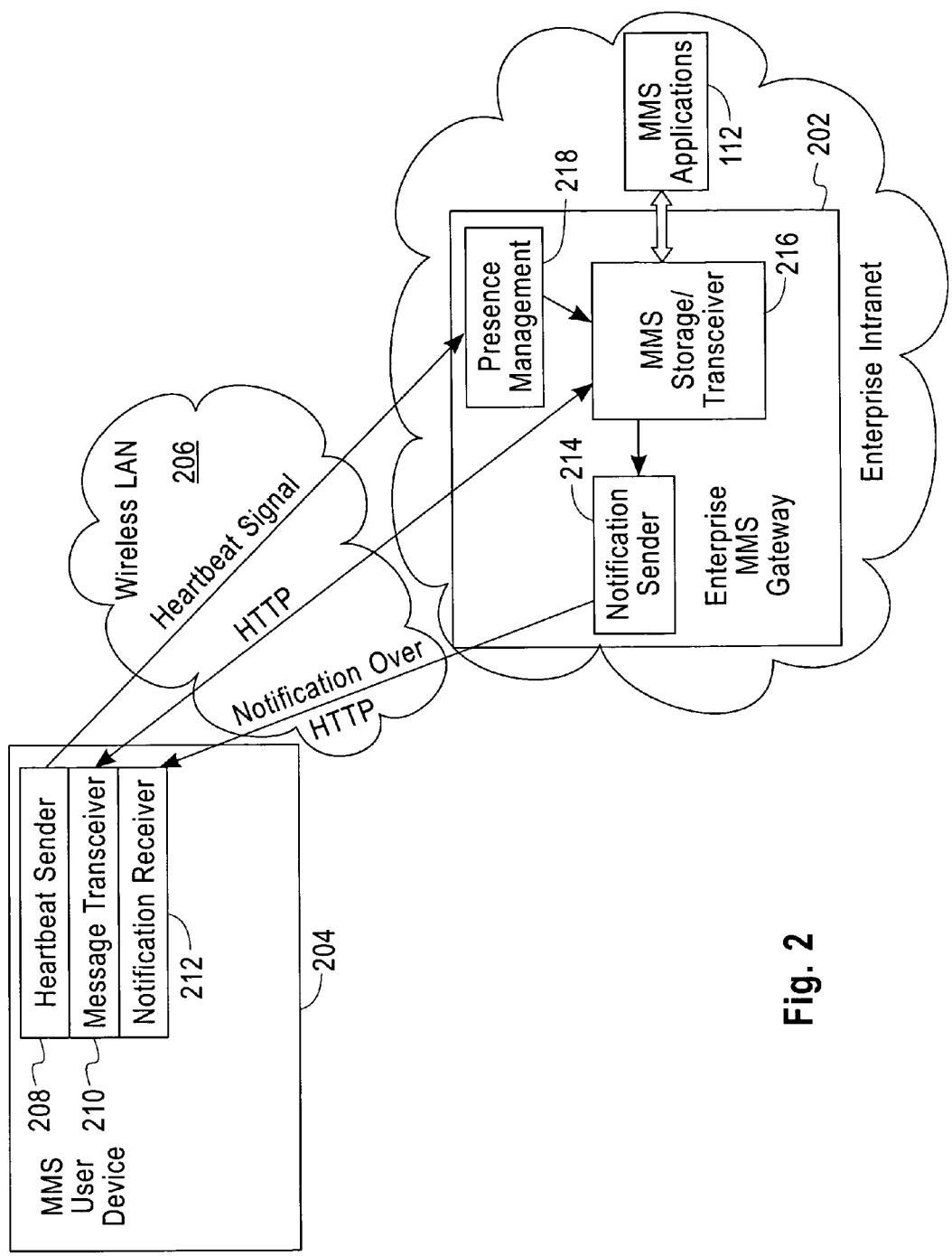
FIG. 2 is a block diagram showing a first embodiment of the MMS system, gateway and user device according to the present invention.

FIG. 2 is a block diagram showing a first embodiment of a MMS system, a MMS gateway 202 and a user device 204 according to the present invention. In the following description to the MMS system, gateway and user device, a method for receiving and sending multimedia message of the present invention is implied.

A concept of the present invention is to send and receive multimedia message over wireless LAN. That is, the multimedia messaging system of the present invention comprises a wireless LAN 206, a MMS user device 204 for sending and receiving multimedia messages over the wireless LAN, and a MMS gateway 202 for receiving, storing and sending multimedia messages over the wireless LAN. Thus, a direct MMS channel is established between the MMS user device 204 for sending and receiving multimedia messages over the wireless LAN and the MMS gateway 202 for receiving, storing and sending multimedia messages over the wireless LAN. As a result, security is ensured and cost will be reduced because of using the wireless LAN. Therefore, to an enterprise, its mobile employees may use MMS user devices 204, such as mobile phones supporting wireless LAN, to interact with MMS applications 112 (communicated with an enterprise MMS gateway) in the enterprise.

Sending and receiving multimedia messages over the wireless LAN may be realized with any existing or future techniques. For example, the HTTP protocol, or any other protocols, may be used to send and/or receive multimedia messages. In the present specification including the accompanying drawings, as an example, the HTTP protocol is adopted in the wireless LAN. Obviously, this should not be interpreted as a limit to the scope of protection of the present invention.

The MMS user device 204 may comprise a message transceiver 210 and a notification receiver 212, and the MMS gateway 202 may comprises a notification sender 214 and a multimedia message storage/transceiver 216 (hereinafter referred to as "MMS storage/transceiver"). The MMS storage/transceiver functions to receive, store and send multimedia messages and communicate with the backend MMS applications in the enterprise. The notification sender functions only to send MMS notifying message to the user device. When a MMS user device is to send a MMS message, the message transceiver sends a request (such as a HTTP request when the HTTP protocol is used) carrying the MMS message to the MMS storage/transceiver. When the MMS user device is to receive a MMS message, that is, when the MMS storage/transceiver is to send a message to the MMS user device, the MMS gateway first calls the notification sender 214 to send a MMS notifying message carrying location information of the MMS message to the MMS user device, the location information indicates the storage location of the MMS message in the MMS storage/transceiver, and is URL information when the HTTP protocol is used. Next, the MMS user device retrieves the location information such as URL from the MMS notifying message. Then the message transceiver sends a request (such as a HTTP request) carrying the location information to the MMS storage/transceiver. And last, the MMS storage/transceiver retrieves the MMS message and returns it to the MMS user device. The message is received by the message transceiver.

In order that the MMS user device is able to determine whether a wireless LAN is available, or in order that the MMS gateway is able to determine whether a MMS user device is reachable, in a preferred embodiment, the MMS user device may further comprise a heartbeat sender, and the MMS gateway may further comprises a presence manager.

In a wireless LAN environment, a MMS user device sends heartbeat signals periodically to the enterprise MMS gateway. The heartbeat signals contain information such as about user device number and IP address, which are also recorded in the database in the presence manager. If the gateway periodically receives the heartbeat signals, it means the corresponding user is located in the coverage of the wireless LAN, and the gateway may send a notification to the user when there is a message to be sent to that user; otherwise it means the user is located in the telecom network or offline, and the gateway does not send any notification to the user even if there is a MMS message to be sent to that user.

As a preferred embodiment, the MMS gateway may comprise a authentication module for verifying whether a user is authorized to access the MMS system.

The MMS gateway of the present invention may be provided in an enterprise intranet, so as to, along with the wireless LAN and the mobile devices of the mobile employees of the enterprise, constitute a private MMS system of the enterprise. The MMS gateway, especially its MMS storage/transceiver, communicates with the backend MMS applications of the enterprise, so as to realize various MMS applications in the enterprise.

Figure 3:
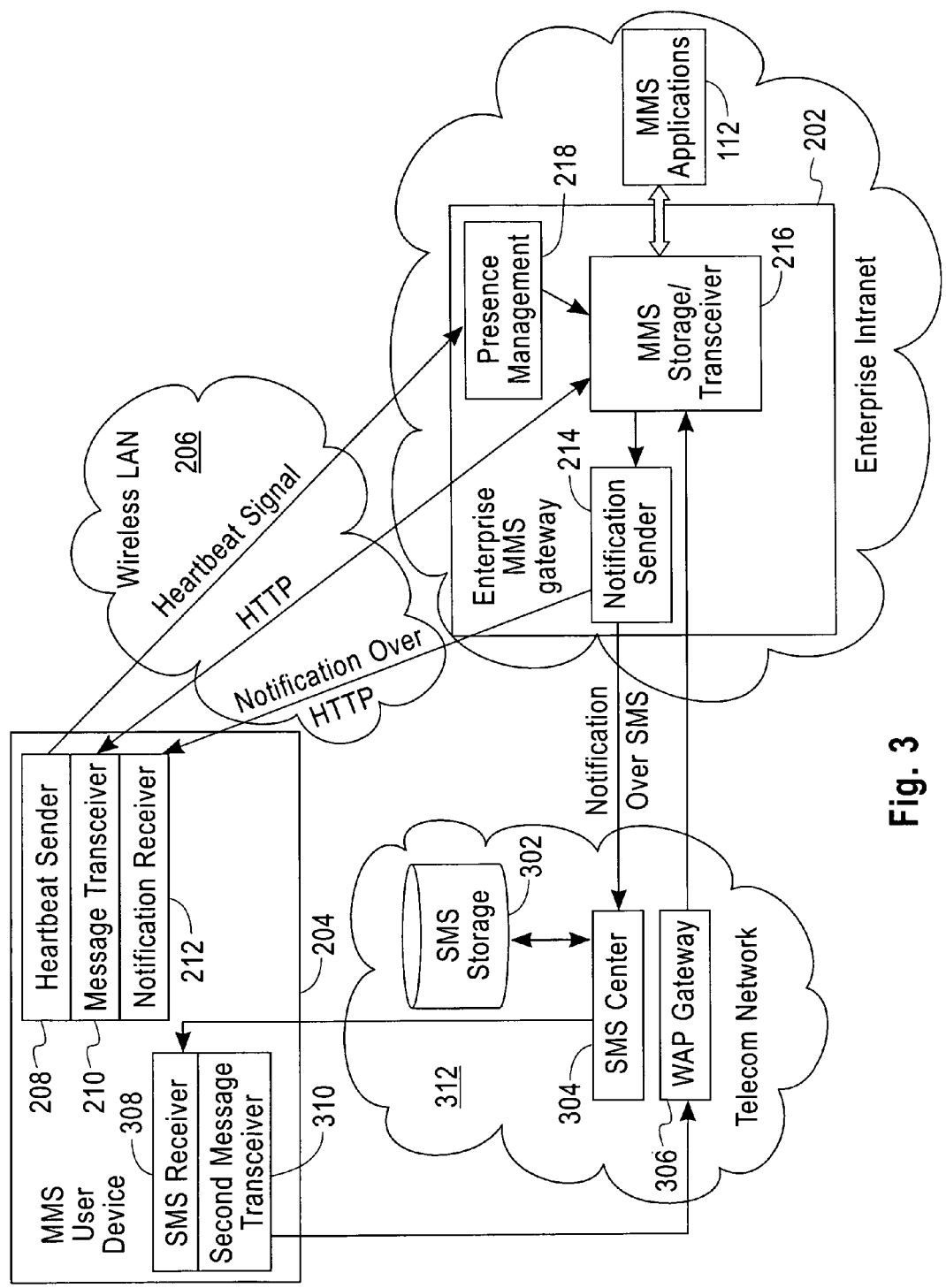
FIG. 3 is a block diagram showing a second embodiment of the MMS system, gateway and user device according to the present invention.

FIG. 3 is a block diagram showing a first embodiment of a MMS system, a MMS gateway 202 and a user device 204 according to the present invention. In the following description to the MMS system, gateway and user device, a method for receiving and sending multimedia message of the present invention is implied.

The present embodiment is obtained by improving the first embodiment having been described with reference to FIG. 2. Therefore, the same components as those in the first embodiment will no longer be described in details.

The present embodiment differs from the first embodiment in that the MMS system supports both wireless LAN and telecom network or mobile phone network, such as GSM, GPRS, CDMA and the like. Accordingly, the MMS system further comprises a telecom network 312. In the system, the MMS user device 204 is able to send and/or receive MMS messages over a wireless LAN 206, as well as over a telecom network 312; also, the MMS gateway is able to receive, store and send MMS messages over the wireless LAN 205, as well as over the telecom network 312.

Thus, when the MMS user device is located within a wireless LAN, a direct MMS channel is established over the wireless network between the MMS user device and the MMS gateway 202 provided in the enterprise intranet. As a result, security is ensured and cost will be reduced because of using the wireless LAN. Therefore, to an enterprise, its mobile employees may use MMS user devices 204, such as mobile phones supporting wireless LAN, to interact with MMS applications 112 (communicated with an enterprise MMS gateway) in the enterprise.

And when no wireless LAN could be used by the MMS user device, by means of the present invention, the MMS user device is still able to send and/or receive multimedia messages via the telecom network, and there is no obstacle for the user to use the MMS user device.

Sending and receiving multimedia messages over the telecom network may be realized with any existing or future techniques. For example, when sending and/or receiving multimedia messages over the telecom network, conventional techniques may be used. In the present specification including the accompanying drawings, as an example, the WAP protocol is adopted in the telecom network. Obviously, this should not be interpreted as a limit to the scope of protection of the present invention.

Specifically, in this case, the MMS user device 204 further comprises a short message receiver (SMS receiver) 308 and a second message transceiver 310 (which is a WAP transceiver when the WAP protocol is used), and the telecom network 312 further comprises a gateway (which is a WAP gateway when the WAP protocol is used) 306 and a short message center (SMS center) 304 including a short message storage (SMS storage) 302. In addition, the notification sender 214 and the MMS storage/transceiver in the MMS gateway 202 are further configured to be able to interact with the MMS user device via the telecom network.

As an example, the notification sender module may have two kinds of interfaces to communicate with user devices. Assuming that the telecom network is a GSM network, and assuming that the HTTP protocol is used in the wireless LAN, then one interface may be a GSM modem interface, another interface may be a HTTP interface. The GSM modem interface is a GSM modem or phone connected to a PC serial port with an appropriate modem driver. Then the notification sender could send SMS to SMS center via the GSM modem. The HTTP interface sends MMS notification information to an MMS user over the wireless LAN.

When sending an MMS message via the telecom network, the MMS user device starts the second message sender 310 to send a request (such as a WAP request) carrying the MMS message to the gateway 306, then the gateway 306 pass the MMS message to the MMS storage/transceiver for message storage. When the MMS user device is going to receive a MMS message via the telecom network, that is, when the MMS storage/transceiver is going to send a message to the MMS user device, it first calls the notification sender 214 to send a SMS notification message to the SMS center 304 of telecom, the SMS notification message carries location information indicating the storage location of the multimedia message in the MMS storage/transceiver. Then the SMS center forwards the notification to the user device 204. After the SMS receiver of the user device receives the SMS and retrieves the location information, it generates a request (such as a WAP request) including the location information and the second message transceiver 310 sends the request to the gateway 306. Finally the MMS storage/transceiver 216 retrieves the MMS message and sends it to the user device 204. The MMS message is received by the second message transceiver.

For realizing automatic switching between the telecom network and the wireless LAN, in a preferable embodiment, the MMS gateway 202 further comprises a presence manager 218 configured to detect the location of the MMS user device 204. When the MMS user device is located within the wireless LAN 205, the MMS gateway communicate with the MMS user device via the wireless LAN; and when the MMS user device could not be detected as within the wireless LAN, the MMS gateway communicate with the MMS user device via the telecom network 312. That is, since the wireless LAN is much better than the telecom network, the system will give first rank to the wireless LAN as long as the wireless LAN is available and regardless whether the telecom network is available. Only when the wireless LAN is unavailable is the telecom used to send and/or receive MMS message.

The detection process may be realized with any existing or future techniques, for example, by detecting the heartbeat signals sent periodically by the heartbeat sender of the MMS user device. Alternatively, the presence manager 218 certainly may make use of prior art locating techniques used in the telecom network, or any other locating techniques.

As in the first embodiment, and as a preferred embodiment, the MMS gateway may comprise a authentication module for verifying whether a user is authorized to access the MMS system. Furthermore, the MMS gateway may be provided in an enterprise intranet and communicate with backend MMS applications of the enterprises, so that various MMS applications of the enterprise may be realized.

In the present solution, the SMS center and the gateway such as WAP gateway are owned by telecom operators. The gateway is for communicating with the MMS user device by means of appropriate protocol such as WAP protocol, and converting, for example, the WAP protocol to a protocol adapted to communicate with the MMS storage/transceiver, such as HTTP protocol, so as to communicate with the MMS storage/transceiver.

Thus, when the MMS user device is located within the wireless LAN, the MMS user device communicate directly, within the enterprise intranet, with the MMS gateway. However, when the telecom network is used in communications, the SMS center and the gateway such as WAP gateway of the telecom network will still be used. In terms of the latter case, the solution could not ensure enough security.

Figure 4:
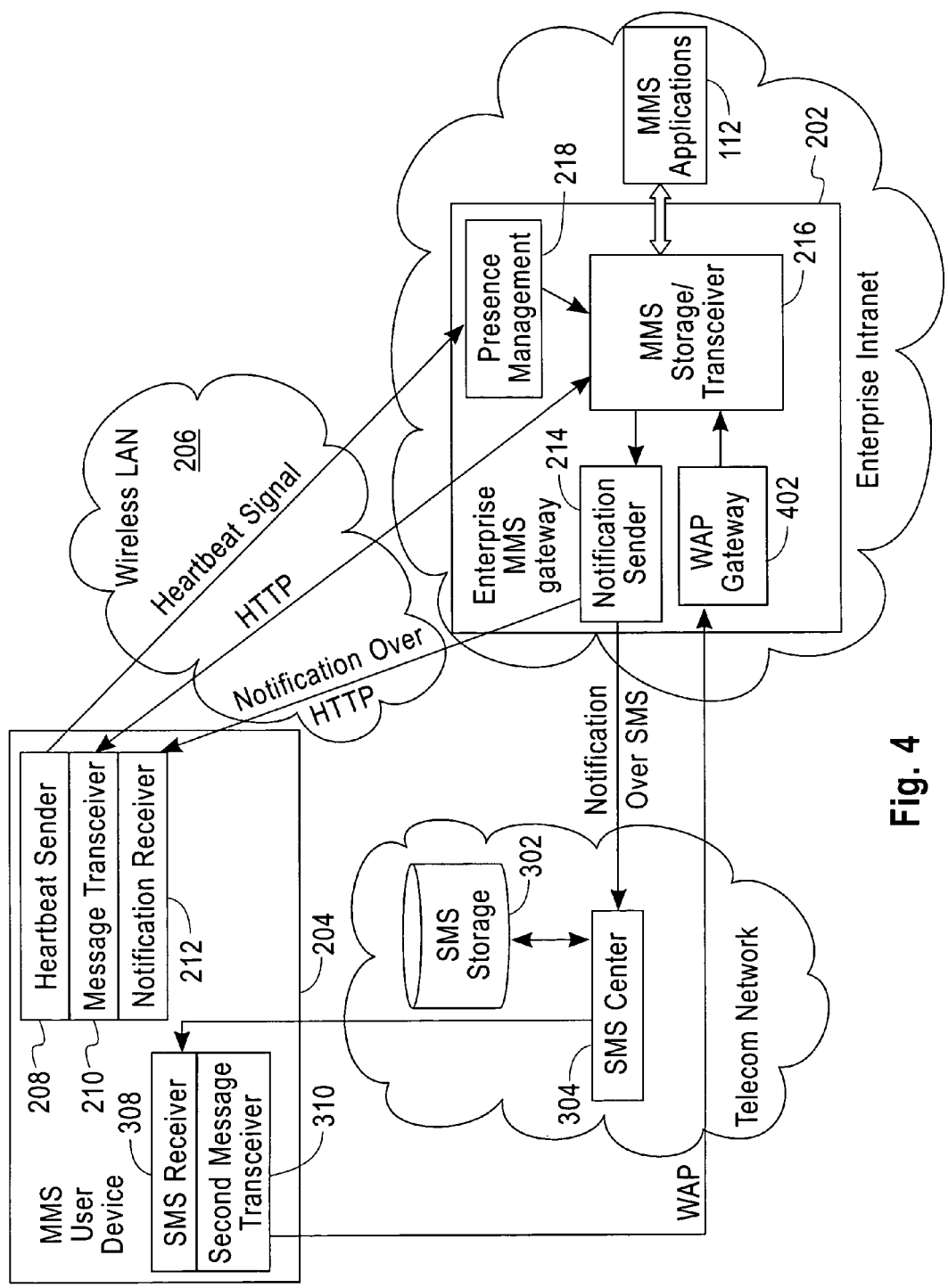
FIG. 4 is a block diagram showing a third embodiment of the MMS system, gateway and user device according to the present invention.

If B2E or B2C needs a high security solution over telecom network, there are two ways to implement it. The first solution is to build an end-to-end security model, which allows a WTLS session to be established between a user device and the enterprise MMS gateway. Unfortunately, the WTLS only operates between a WAP client and a WAP gateway in the current WAP standard, therefore the WAP gateway has to be moved from the operator domain to the enterprise domain, that is, it is not the telecom operator who own the WAP gateway, but the enterprise who owns the WAP gateway. In other words, the WAP gateway 402 is provided in the MMS gateway, as shown in FIG. 4 (the third embodiment).

The third embodiment only needs a telecom's SMS center 304 to store and forward MMS notification. But since the notification only carries the MMS location information, which is useful only in the intranet of an enterprise, so it's not necessary to encrypt the location information to protect the notification message. One advantage of the method is that this end-to-end security solution doesn't change the current MMS encapsulation and protocol standard, therefore the MMS user device 204 can be used in the invention without any change.

But some business doesn't want to own and maintain a WAP gateway because operators have already run a WAP gateway in their infrastructure. So we provide the second security solution in the invention, which is called Cipher-MMS Security Version.

Figure 5:
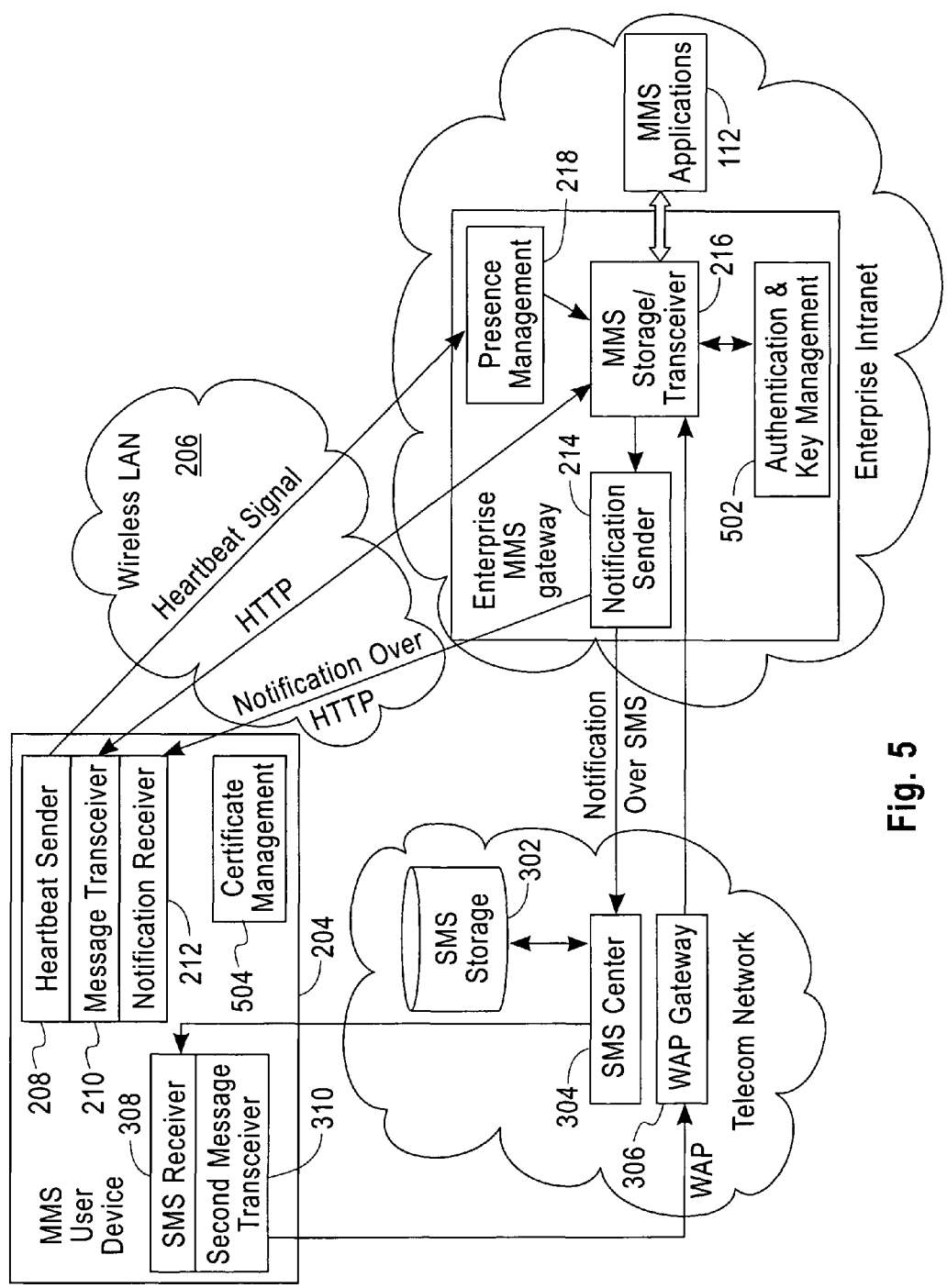
FIG. 5 is a block diagram showing a fourth embodiment of the MMS system, gateway and user device according to the present invention.

As shown in FIG. 5, in a fourth embodiment, an authentication and key management module 502 is added in the MMS gateway to distribute symmetric keys to users and a certificate management module 504 is added in the user device. Both the MMS gateway and the user device deploy the same symmetric cipher to encode and decode MMS messages to protect the privacy of these messages.

The encryption may be realized in any possible manner. The following is an example.

1. If the MMS user device has no certificate of the MMS gateway, it first sends a CA (certificate) requirement to the gateway. After the gateway confirms that the user has the access to send and receive MMS according to the user device number, the gateway's CA is sent to the user device. There are three methods to distribute a certificate to a user device: manually synchronize a certificate into the user device via an infrared port, or send a certificate via SMS or WAP response.

2. The MMS user device sends a Master Key requirement to the gateway and the gateway creates a session ID and a master key, generally a random object, and sends them to the device via SMS or WAP response. The random object is encrypted by the gateway's private key.

3. The random object is decoded by the user device and mixed with its phone number and session ID to generate a shared secret key. The mixing operation may be any operation, the simplest is XOR operation. At the same time, the gateway also generates a shared secret key with the same algorithm.

4. Both the MMS user device and the MMS gateway can secretly communicate with each other by encrypting MMS messages with the shared secret key.

In above encryption process, both the MMS user device and the MMS gateway can fresh the shared secret key by changing the session ID to prevent the threat of attacks stemming from key reuse.

While the invention has been described with reference to specific embodiments disclosed herein, it is not confined to the details set forth herein, and this application is intended to cover all the variations or equivalents that are obvious to a person skilled in the art having read the specification.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A multimedia messaging service (MMS) system comprising:
    a communication interface configured to communicate with a wireless local area network (LAN);
    a communication interface configured to directly communicate with a MMS wireless user device to send and receive multimedia messages over said wireless LAN;
    a MMS gateway for storing and sending the multimedia messages sent by said MMS wireless user device, said MMS gateway to operate cooperatively with said wireless user device deployed in Business-to-Enterprise and Business-to-Customer applications to securely support mobile employee and consumers; and
    wherein said MMS gateway sets up a direct communication channel between the MMS wireless user device and enterprise applications, and enables bypassing of an operator's MMS Center with no need to store MMS messages on an MMS Center;
    the MMS gateway comprising:
        a multimedia message storage/transceiver comprising a multimedia message stored therein;
        a presence manager that detects a location of the MMS user device and confirms whether said MMS user device is located within said wireless LAN by detecting heartbeat signals sent by a heartbeat sender of the MMS user device, wherein the heartbeat signals contain a wireless user device number and IP address, wherein the presence manager further detects roaming by the user device and responsive to said roaming, switches the multimedia message storage/transceiver's multimedia message preferred delivery medium;
        a database for recording the user device number and the IP address;
        a notification sender that sends a notification to the MMS wireless user device, over said wireless LAN, upon confirmation that said wireless user device is located within the wireless LAN, said notification indicating that the MMS gateway has a stored multimedia message to be sent to the wireless user device; and
    the MMS wireless user device comprising:
        a heartbeat sender,
        a message transceiver,
        a notification receiver,
        a short message receiver and
        a second message transceiver;
    wherein the multimedia messaging service system further comprises:
        a telecom network comprising a short message center and a gateway, said telecom network communicating with said MMS wireless user device and said MMS gateway, and
        wherein said MMS wireless user device and said MMS gateway make use of the telecom network to send, receive and store multimedia messages,
        wherein when said MMS wireless user device is located within said wireless LAN, said MMS gateway communicates with the MMS wireless device via said wireless LAN; and
    wherein when said MMS user device fails to be detected within said wireless LAN, said MMS gateway communicates with said MMS wireless user device via the telecom network;
    wherein when said multimedia message storage/transceiver has a multimedia message stored therein and said presence manager detects that said MMS wireless user device is not located within said wireless LAN, the notification sender sends a short message notification to said short message center, which sends a short message to said short message receiver so as to notify said MMS wireless user device;
    wherein said message transceiver is configured to send a multimedia message by sending a HTTP request carrying said multimedia message over said wireless LAN to said multimedia message storage/transceiver, or, when said notification receiver receives said notification, to send a request carrying storage location information of the multimedia message over said wireless LAN to said multimedia message storage/transceiver, so that said multimedia message storage/transceiver retrieves the multimedia message according to said storage location information and returns it to said MMS wireless user device via said wireless LAN to be received by said message transceiver;
    wherein said second message transceiver is configured to send a multimedia message to said multimedia message storage/transceiver by sending a request carrying said multimedia message to said gateway, or, when said short message receiver receives said notification, to send a request carrying storage location information of the multimedia message via said gateway to said multimedia message storage/transceiver, so that said multimedia message storage/transceiver retrieves the multimedia message according to said storage location information and returns it to said MMS wireless user device via said telecom network, said multimedia message is received by said second message transceiver;
    wherein the multimedia message storage/transceiver, upon confirmation that the wireless user device is located within the wireless LAN, sends the stored multimedia message to the wireless user.

2. The multimedia messaging service system as claimed in claim 1, wherein said MMS gateway further comprises an authentication module for verifying the authorization of MMS wireless user devices,
    wherein said MMS gateway is provided in an enterprise Intranet of an enterprise, communicates with multimedia message applications of the enterprise, encrypts the communication channel between the client and a backend MMS server with a security protocols; and enhances security for said MMS applications.

3. The multimedia messaging service system as claimed in claim 2, wherein when the user moves into an office that enables the wireless LAN, and the user's MMS wireless device can access said enterprise Intranet via said wireless LAN, the backend server detects said user roaming and switches a working model from a telecom model to a WLAN model, making the user able to user the MMS wireless device to access the MMS applications via the WLAN in the enterprise.

4. The multimedia messaging service system as claimed in claim 1, wherein said MMS gateway is provided in an enterprise intranet and communicates with multimedia message applications of the enterprise.

5. The multimedia messaging service system as claimed in claim 1, wherein said MMS gateway further comprises an authentication module for verifying the authorization of MMS wireless user devices.

6. The multimedia messaging service system as claimed in claim 5, wherein said authentication module is further configured to realize key management, and said MMS user wireless device further comprises a certificate manager, which, along with said authentication module, conducts certificate management for the MMS wireless user device and encryption management for the communication between the MMS wireless user device and the MMS gateway.

7. The multimedia messaging service system as claimed in claim 1, wherein said MMS gateway is provided in an enterprise intranet and communicates with multimedia message applications of the enterprise.

8. The multimedia messaging service system as claimed in claim 1, wherein:
said MMS wireless user device comprises a heartbeat sender, a message transceiver, a notification receiver, a short message receiver and a second message transceiver;
said telecom network further comprises a short message center, and
wherein: said presence manager detects the heartbeat signals sent by the heartbeat sender so as to confirm whether said MMS wireless user device is located within said wireless LAN;
wherein when said multimedia message storage/transceiver has a multimedia message stored therein and said presence manager detects that said MMS wireless user device is located within said wireless LAN, the notification sender sends a notification over said wireless LAN to said MMS wireless user device, said notification is received by said notification receiver;
wherein when said multimedia message storage/transceiver has a multimedia message stored therein and said presence manager detects that said MMS wireless user device is not located within said wireless LAN, the notification sender sends a short message notification to said short message center, which sends a short message to said short message receiver so as to notify said MMS wireless user device;
wherein said message transceiver is configured to send a multimedia message by sending a HTTP request carrying said multimedia message over said wireless LAN to said multimedia message storage/transceiver, or, when said notification receiver receives said notification, to send a request carrying storage location information of the multimedia message over said wireless LAN to said multimedia message storage/transceiver, so that said multimedia message storage/transceiver retrieves the multimedia message and returns it to said MMS wireless user device via said wireless LAN to be received by said message transceiver;
wherein said second message transceiver is configured to send a multimedia message to said multimedia message storage/transceiver by sending a request carrying said multimedia message to said gateway, or, when said short message receiver receives said notification, to send a request carrying storage location information of the multimedia message via said gateway to said multimedia message storage/transceiver, so that said multimedia message storage/transceiver retrieves the multimedia message and returns it to said MMS wireless user device via said gateway and said telecom network, said multimedia message is received by said second message transceiver.

9. The multimedia messaging service system as claimed in claim 8, wherein: said MMS gateway further comprises an authentication module for verifying the authorization of MMS wireless user devices.

10. The multimedia messaging service system as claimed in claim 8, wherein said MMS gateway is provided in an enterprise intranet and communicates with multimedia message applications of the enterprise.

11. A multimedia message wireless user device comprising:
a heartbeat sender for sending heartbeat signals to be detected by a presence manager of a multimedia message gateway for detecting whether the multimedia message wireless user device is located within a wireless LAN, wherein the heartbeat signals comprise a device number and IP address of the multimedia message wireless user device;
a message transceiver,
a notification receiver for receiving from the multimedia message gateway over the wireless LAN a notification indicating that there is a multimedia message to be received,
a short message receiver, and
a message transceiver for sending multimedia messages by sending a request carrying said multimedia message over said wireless LAN to the multimedia message gateway, and in response to said notification, sending a request carrying a storage location information of the multimedia message over said wireless LAN so that the multimedia message wireless user device directly receives said multimedia message from the multimedia message gateway over said wireless LAN when the presence manager confirms that the multimedia message user device is located within the wireless LAN
wherein the multimedia message wireless user device is part of a telecom network comprising a short message center and a gateway, said telecom network communicating with said multimedia message wireless user device and said gateway, and
wherein said multimedia message wireless user device and said multimedia message gateway make use of the telecom network to send, receive and store multimedia messages,
wherein when said multimedia message wireless user device is located within a wireless LAN, said multimedia message gateway communicates with the multimedia message wireless device via said wireless LAN; and
wherein when said multimedia message user device fails to be detected within said wireless LAN, said multimedia message gateway communicates with said multimedia message wireless user device via the telecom network;

wherein when said multimedia message storage/transceiver has a multimedia message stored therein and said presence manager detects that said multimedia message wireless user device is not located within said wireless LAN, the notification sender sends a short message notification to said short message center, which sends a short message to said short message receiver so as to notify said multimedia message wireless user device;

wherein said message transceiver is configured to send a multimedia message by sending a HTTP request carrying said multimedia message over said wireless LAN to said multimedia message storage/transceiver, or, when said notification receiver receives said notification, to send a request carrying storage location information of the multimedia message over said wireless LAN to said multimedia message storage/transceiver, so that said multimedia message storage/transceiver retrieves the multimedia message according to said storage location information and returns it to said multimedia message wireless user device via said wireless LAN to be received by said message transceiver;

wherein said second message transceiver is configured to send a multimedia message to said multimedia message storage/transceiver by sending a request carrying said multimedia message to said gateway, or, when said short message receiver receives said notification, to send a request carrying storage location information of the multimedia message via said gateway to said multimedia message storage/transceiver, so that said multimedia message storage/transceiver retrieves the multimedia message according to said storage location information and returns it to said multimedia message wireless user device via said telecom network, said multimedia message is received by said second message transceiver;

wherein the multimedia message storage/transceiver, upon confirmation that the wireless user device is located within the wireless LAN, sends the stored multimedia message to the wireless user.

12. The multimedia message wireless user device as claimed in claim 11, further comprising:

wherein the short message receiver for receiving short message notifications from a telecom network when the presence manager cannot confirm that the wireless user device is located within the LAN; and wherein the multimedia message wireless user device further comprises: a second message transceiver, for sending a multimedia message by sending a request carrying said multimedia message to a gateway of a telecom network or via a telecom network to a gateway outside of the telecom network, and, in response to said short message notification, sending a request carrying storage location information of the multimedia message via said gateway, so that the multimedia message is received from the telecom network.

13. A multimedia messaging service (MMS) system comprising:

a communication interface configured to communicate with a wireless local area network (LAN);

a communication interface configured to directly communicate with a MMS wireless user device to send and receive multimedia messages over said wireless LAN;

wherein said MMS wireless user device comprises a heartbeat sender, a message transceiver, a notification receiver, a short message receiver and a second message transceiver;

a MMS gateway for storing and sending the multimedia messages sent by said MMS wireless user device, said MMS gateway to operate cooperatively with said wireless user device deployed in Business-to-Enterprise and Business-to-Customer applications to securely support mobile employee and consumers; and wherein said MMS gateway sets up a direct communication channel between the MMS wireless user device and enterprise applications, and enables bypassing of an operator's MMS Center with no need to store MMS messages on an MMS Center;

the MMS gateway comprising:

a multimedia message storage/transceiver comprising a multimedia message stored therein;

a presence manager that detects a location of the MMS user device and confirms whether said MMS user device is located within said wireless LAN by detecting heartbeat signals sent by a heartbeat sender of the MMS user device, wherein the heartbeat signals contain a wireless user device number and IP address, wherein the presence manager further detects roaming by the user device and responsive to said roaming, switches the multimedia message storage/transceiver's multimedia message preferred delivery medium;

a database for recording the user device number and the IP address;

a notification sender that sends a notification to the MMS wireless user device, over said wireless LAN, upon confirmation that said wireless user device is located within the wireless LAN, said notification indicating that the MMS gateway has a stored multimedia message to be sent to the wireless user device; and wherein the multimedia messaging service system further comprises:

a telecom network comprising a short message center and a gateway, said telecom network communicating with said MMS wireless user device and said MMS gateway, and wherein said MMS wireless user device and said MMS gateway make use of the telecom network to send, receive and store multimedia messages, wherein when said MMS wireless user device is located within said wireless LAN, said MMS gateway communicates with the MMS wireless device via said wireless LAN; and wherein when said MMS user device fails to be detected within said wireless LAN, said MMS gateway communicates with said MMS wireless user device via the telecom network;

wherein the multimedia message storage/transceiver, upon confirmation that the wireless user device is located within the wireless LAN, sends the stored multimedia message to the wireless user;

wherein the presence manager detects the heartbeat signals sent by the heartbeat sender so as to confirm whether said MMS wireless user device is located within said wireless LAN;

wherein when said multimedia message storage/transceiver has a multimedia message stored therein and said presence manager detects that said MMS wireless user device is located within said wireless LAN, the notification sender sends a notification over said wireless LAN to said MMS wireless user device, said notification is received by said notification receiver;

wherein when said multimedia message storage/transceiver has a multimedia message stored therein and said presence manager detects that said MMS wireless user device is not located within said wireless LAN, the notification sender sends a short message notification to said short message center, which sends a short message to said short message receiver so as to notify said MMS wireless user device;

wherein said message transceiver is configured to send a multimedia message by sending a HTTP request carrying said multimedia message over said wireless LAN to said multimedia message storage/transceiver, or, when said notification receiver receives said notification, to send a request carrying storage location information of the multimedia message over said wireless LAN to said multimedia message storage/transceiver, so that said multimedia message storage/transceiver retrieves the multimedia message and returns it to said MMS wireless user device via said wireless LAN to be received by said message transceiver; and wherein said second message transceiver is configured to send a multimedia message to said multimedia message storage/transceiver by sending a request carrying said multimedia message to said gateway, or, when said short message receiver receives said notification, to send a request carrying storage location information of the multimedia message via said gateway to said multimedia message storage/transceiver, so that said multimedia message storage/transceiver retrieves the multimedia message and returns it to said MMS wireless user device via said gateway and said telecom network, said multimedia message is received by said second message transceiver.

* * * * *